(12) United States Patent
Tagaya

(10) Patent No.: US 12,081,732 B2
(45) Date of Patent: Sep. 3, 2024

(54) IMAGE PICKUP APPARATUS, CONTROL METHOD OF IMAGE PICKUP APPARATUS, AND STORAGE MEDIUM

(71) Applicant: CANON KABUSHIKI KAISHA, Tokyo (JP)

(72) Inventor: Akira Tagaya, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 157 days.

(21) Appl. No.: 17/973,270

(22) Filed: Oct. 25, 2022

(65) Prior Publication Data

US 2023/0144256 A1 May 11, 2023

(30) Foreign Application Priority Data

Nov. 10, 2021 (JP) .................... 2021-183581

(51) Int. Cl.
*H04N 23/55* (2023.01)
*G03B 17/14* (2021.01)
*G06T 7/73* (2017.01)
*H04N 17/00* (2006.01)
*H04N 23/60* (2023.01)

(52) U.S. Cl.
CPC .......... *H04N 17/002* (2013.01); *G03B 17/14* (2013.01); *G06T 7/74* (2017.01); *H04N 23/55* (2023.01); *H04N 23/60* (2023.01); *G06T 2207/10024* (2013.01)

(58) Field of Classification Search
CPC .................. H04N 23/55; G03B 17/14
USPC ........................................ 348/207.99
See application file for complete search history.

(56) References Cited

U.S. PATENT DOCUMENTS

2004/0078100 A1 * 4/2004 Okamura ............... G05B 19/19
700/56

FOREIGN PATENT DOCUMENTS

| CN | 112770021 A | * | 5/2021 | .......... H04N 5/2253 |
| JP | 2017225073 A | * | 12/2017 | |
| JP | 7220972 B1 | * | 2/2023 | |

* cited by examiner

*Primary Examiner* — Anthony J Daniels
(74) *Attorney, Agent, or Firm* — Cowan, Liebowitz & Latman, P.C.

(57) ABSTRACT

An image pickup apparatus includes an optical system, an image sensor configured to photoelectrically convert an optical image formed by the optical system and to output image data, an infrared cut filter movable between a first position at which the infrared cut filter is inserted into an optical path of the optical system and a second position at which the infrared cut filter is removed from the optical path of the optical system, and a control unit configured to determine, based on the image data, whether or not the infrared cut filter is located at a position different from each of the first position and the second position.

20 Claims, 4 Drawing Sheets

IMAGE PICKUP APPARATUS, CONTROL METHOD OF IMAGE PICKUP APPARATUS, AND STORAGE MEDIUM

BACKGROUND

Technical Field

The disclosure relates to an image pickup apparatus, a control method of the image pickup apparatus, and a storage medium.

Description of the Related Art

An infrared cut filter that filters an infrared component as a noise component for an image has conventionally been used in an image pickup apparatus, such as a network camera, that needs to provide a stable image to a user even in an environment with a large difference in brightness from daytime to nighttime. Such an image pickup apparatus includes an insertion/removal mechanism for inserting and removing an infrared cut filter in order to irradiate an infrared LED at night for imaging. However, the infrared cut filter cannot be normally inserted or removed due to the shake or impact applied to the image pickup apparatus. In a case where a detection unit configured to detect the position of the infrared cut filter, such as a photo-interrupter and an encoder, is provided as a countermeasure, the power consumption will increase and the image pickup apparatus will become larger.

Japanese Patent Laid-Open No. ("JP") 2017-225073 discloses an image pickup apparatus that detects insertion and removal states of an infrared cut filter based on signal intensity of infrared light by devising a light emission pattern of an infrared LED.

However, the image pickup apparatus disclosed in JP 2017-225073 cannot detect abnormality in the insertion and removal states of the infrared cut filter such as a state where the infrared cut filter is stopped in the middle of the insertion or removal operation or a state where the infrared cut filter is displaced.

SUMMARY

The disclosure provides an image pickup apparatus, a control method of the same, and a storage medium, each of which can detect an abnormality in an insertion or removal state of an infrared cut filter with low power consumption and a small configuration.

An image pickup apparatus according to one aspect of the disclosure includes an optical system, an image sensor configured to photoelectrically convert an optical image formed by the optical system and to output image data, an infrared cut filter movable between a first position at which the infrared cut filter is inserted into an optical path of the optical system and a second position at which the infrared cut filter is removed from the optical path of the optical system, a hardware processor, and a memory for storing instructions to be executed by the hardware processor, wherein, when the instructions stored in the memory are executed by the hardware processor, the image pickup apparatus functions as a control unit configured to determine, based on the image data, whether or not the infrared cut filter is located at a position different from each of the first position and the second position.

A control method according to another aspect of the disclosure of an image pickup apparatus including an infrared cut filter movable between a first position at which the infrared cut filter is inserted into an optical path of an optical system and a second position at which the infrared cut filter is removed from the optical path of the optical system includes the steps of acquiring image data by photoelectrically converting an optical image formed by the optical system, and determining, based on the image data, whether or not the infrared cut filter is located at a position different from each of the first position and the second position. A storage medium storing a program that causes a computer to execute the above control method also constitutes another aspect of the disclosure.

Further features of the disclosure will become apparent from the following description of exemplary embodiments with reference to the attached drawings.

DESCRIPTION OF THE EMBODIMENTS

Referring now to the accompanying drawings, a detailed description will be given of embodiments according to the disclosure.

Figure 1:
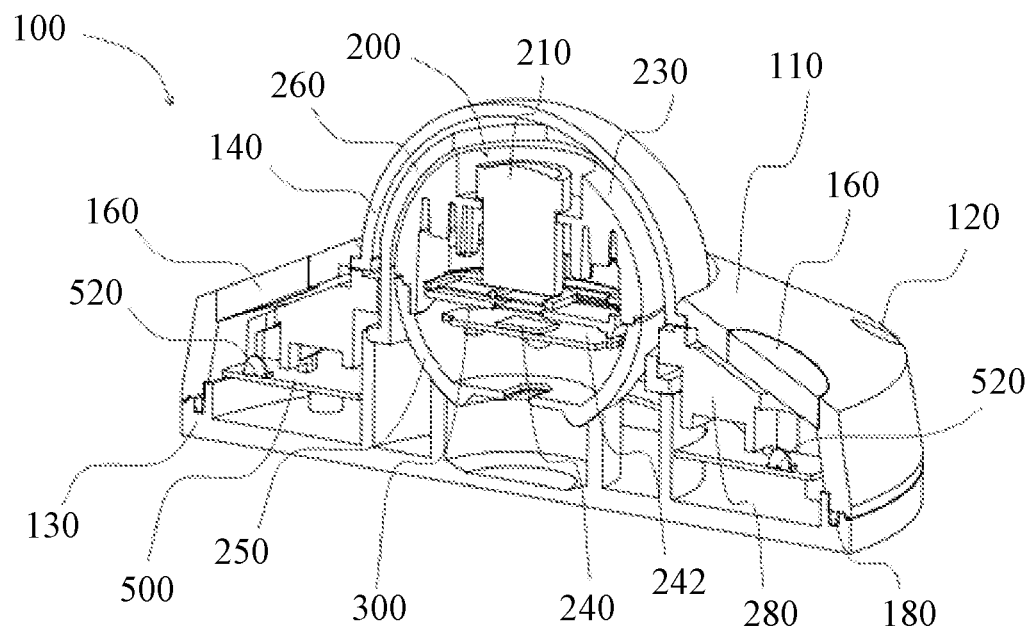
FIG. 1 is an overall sectional view of an image pickup apparatus according to this embodiment.

Referring now to FIG. 1, a description will be given of a network camera (image pickup apparatus) according to this embodiment. While this embodiment will describe the network camera as the image pickup apparatus, such as a surveillance camera and an in-vehicle camera, this embodiment is not limited to this example and is applicable to an image pickup apparatus other than the network camera.

FIG. 1 is an overall sectional view of the network camera (image pickup apparatus) 100 according to this embodiment. The network camera 100 can capture and record an image. The network camera 100 includes a housing, and the housing includes a cover portion 110 and a base portion 130. Each of the cover portion 110 and the base portion 130 can be manufactured by resin molding such as polycarbonate. An installation hole is formed in the base portion 130, and the base portion 130 is fixed to a wall or a vehicle using screws or the like. Each of the cover portion 110 and the base portion 130 includes fastening portions 120, and are fastened to each other with screws or the like.

A lens protecting member 140 is hemispherical and serves to protect a lens (optical system) 210 and another component housed inside the housing from impact and dust. The lens protecting member 140 is fixed to the cover portion 110 by ultrasonic welding or the like. Since an image is captured through the lens protecting member 140, the lens protecting member 140 is treated as an optical element and its transparency and dimensional accuracy are important. The lens protecting member 140 is made, for example, of transparent polycarbonate. The cover portion 110 has a window 160 for irradiating the infrared LED. Irradiating the infrared LED enables an image to be captured in a dark environment such as at night. The color of the window 160 is adjusted to a color that blocks visible light and transmits infrared light. Thereby, the components inside the housing cannot be seen from the outside. Generally, the infrared light has a wavelength of approximately 750 nm to 950 nm. The inside of the housing of the window 160 has a lens shape, and can condense or diffuse the light of the infrared LED. The window 160 is integrally molded with the cover portion 110, and is made, for example, of black transparent polycarbonate.

A camera unit 200, a gasket 180, a circuit board 500, an infrared LED 520, and a holding member 280 are housed inside the housing. The gasket 180 is disposed while being pressed against a boundary between the cover portion 110 and the base portion 130. Pressing the gasket 180 can enhance the adhesion of the gasket 180 to the housing and realize the sealing performance. This is similar to the sealing structure of the O-ring. The lens protecting member 140, the window 160, and the gasket 180 form a sealed structure and prevent water and dust from entering the inside of the housing. The shape of the gasket 180 is approximately a rhombus so as to reduce a reaction force in a case where the gasket 180 is pressed. The gasket 180 is made, for example, of silicon rubber.

The camera unit 200 is disposed approximately at the center of the housing, and includes a lens 210, a lens holder 230, an image sensor 240, an imaging substrate mounted with the image sensor 240, an infrared cut filter unit 300, a lens cover 250, and a camera holder 260. The lens 210 is screwed with and held by the lens holder 230, and includes a single focus lens whose position can be adjusted in the optical axis direction during focusing. The imaging substrate 242 is fixed onto the infrared cut filter unit 300 with an adhesive or a screw. The lens holder 230 and the lens cover 250 are held so as to be covered by the camera holder 260 and the base portion 130, and can be tilted and rotated.

An opening for capturing an image is formed in front of the lens holder 230. A hole for passing a wire or the like is formed behind the lens cover 250. The lens holder 230 can be manufactured, for example, by metal die casting or resin molding such as polycarbonate. The camera holder 260 is continuously opened in a range from an approximately horizontal position to an approximately vertical position, which is an imaging range. The camera holder 260 restricts a range of tilt operation. The camera holder 260 can be manufactured by molding a resin such as polycarbonate.

The holding member 280 holds the camera unit 200 so that the camera unit 200 can be panned via the camera holder 260, and is fixed to the base portion 130 with screws or the like. A direction of a panning axis is approximately perpendicular to the installation plane. The holding member 280 can be manufactured by resin molding, for example, using polycarbonate.

The circuit board 500 is housed inside the housing. A central portion of the circuit board 500 is open, and the camera unit 200 is disposed there. An infrared LED 520 is mounted on the circuit board 500. The circuit board 500 includes a control unit 501 such as a central processing unit (CPU), and is responsible for overall control of the network camera 100, such as control of the infrared cut filter unit 300 and the infrared LED 520, power supply, camera control, and connection to a network. The circuit board 500 and the imaging substrate 242 are electrically connected by a wire (not shown) or the like.

Figure 2:
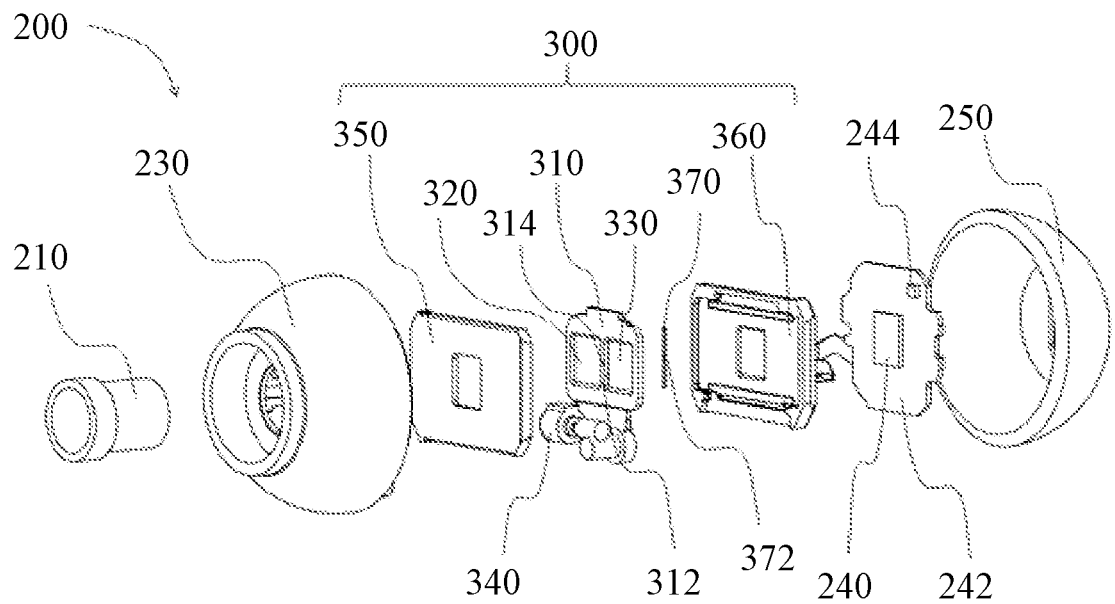
FIG. 2 is a detailed exploded view of a camera unit according to this embodiment.

Referring now to FIG. 2, a detailed description will be given of the configuration of the camera unit 200. FIG. 2 is a detailed exploded view of the camera unit 200. In the camera unit 200, light that has passed through the lens 210 passes through the infrared cut filter unit 300 and is received by the image sensor 240. The image sensor 240 is a photoelectric conversion element, such as a Complementary Metal Oxide Semiconductor (CMOS) sensor or a Charge Coupled Device (CCD) sensor, photoelectrically converts an optical image formed by the lens 210 and outputs an electric signal (image data) to the circuit board 500. The image sensor 240 is mounted on the side of the lens 210 of the imaging substrate 242. The circuit board 500 records the received image data or distributes it through the network. A direction detecting unit 244 is mounted on the imaging substrate 242. The direction detecting unit 244 is, for example, an acceleration sensor. Using an acceleration sensor for an in-vehicle application can detect a strong shake or impact applied to the network camera 100, and determine sudden braking or a collision. Since the gravity direction is detectable, a direction in which the network camera 100 is installed can be detected. The direction detecting unit 244 can define (detect) a predetermined axis direction (predetermined direction) using the gravity direction.

The infrared cut filter unit 300 includes a filter holder 310, an infrared cut filter 320, a glass filter 330, a low reflection unit 370, a filter driving mechanism (driving unit) 340, a holder base 360, and a holder cover 350. The infrared cut filter unit 300 is fixed to the lens holder 230 with screws or the like. The filter holder 310 is held so as to cover the edge between the infrared cut filter 320 and the glass filter 330, and the infrared cut filter 320 and the glass filter 330 are fixed by adhesion or thermal caulking. The infrared cut filter 320 has a function of not transmitting infrared light exceeding about 700 nm. On the contrary, the glass filter 330 transmits light in a wide wavelength range including infrared light.

The filter holder 310 has a frame portion 312 between the infrared cut filter 320 and the glass filter 330. The longitudinal direction of the frame portion 312 coincides with one axis defined by the direction detecting unit 244. A detection shape 314 is formed on the frame portion 312, and has a penetrating shape so as to transmit light. The filter holder 310 is movably held by the holder base 360 and the holder cover 350. The filter holder 310, the holder base 360, and the holder cover 350 are manufactured by resin molding, for example, using polycarbonate. A low reflection unit 370 is fixed to the side of the image sensor 240 of the filter holder 310 with double-sided tape or the like. The low reflection unit 370 has a penetration portion 372 that transmits light at a position corresponding to the detection shape 314 of the frame portion 312. The low reflection unit 370 may be made of a material having a reflectance of 5% or less.

The filter driving mechanism 340 drives the filter holder 310 so that the infrared cut filter 320 can be inserted into and removed from an imaging optical path. In this embodiment, the filter driving mechanism 340 includes, for example, a stepping motor and a gear, and moves the filter holder 310 between a first position at which the infrared cut filter 320 is inserted into the imaging optical path and a second position at which the glass filter 330 is inserted into the imaging optical path. The filter driving mechanism 340 calibrates the initial position by bringing the filter holder 310 into contact with a driving end on the first position side when the network camera 100 is powered on. Thereafter, the filter driving mechanism 340 controls the moving amount of the filter holder 310 by driving the stepping motor by a predetermined number of pulses through pulse density modulation (PDM) control of the stepping motor.

In a case where the imaging environment is bright in the daytime or under illumination, the network camera 100 captures an image at the first position at which the infrared cut filter 320 is inserted into the imaging optical path. Sunlight and illumination light contain many infrared components that are difficult for the human eye to see. In general, the infrared light component often becomes a noise component for an image. Therefore, inserting the infrared cut filter 320 can remove the infrared light component and provide an image with less noise. On the other hand, in a case where visualizing illumination is unavailable at night or in a dark indoor environment, it is necessary to turn on the infrared LED 520 to brightly illuminate the imaging range. The image sensor 240 can also receive an infrared component that is difficult for the human eyes to see. Therefore, turning on the infrared LED 520 can capture an image even in a dark environment. At this time, the network camera 100 captures an image at the second position at which the glass filter 330 is inserted into the imaging optical path, and transmits the infrared component to enable imaging in the dark place.

Figure 3A:
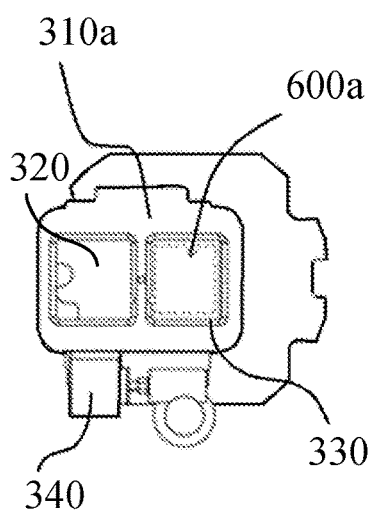
FIGS. 3A to 3C explain an operation of a filter driving mechanism according to this embodiment.
Figure 3B:
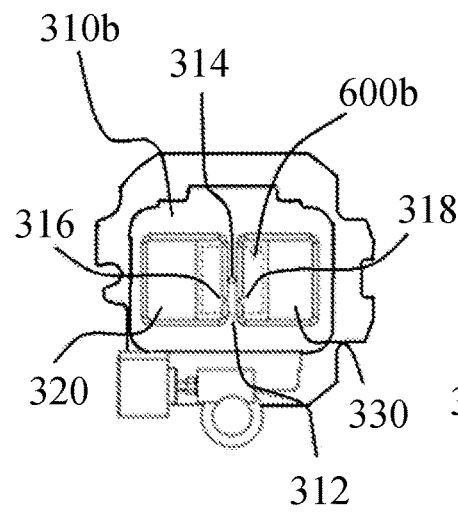
Figure 3C:
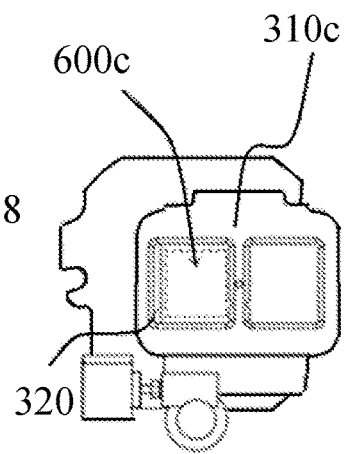

Referring now to FIGS. 3A to 3C, a description will be given of an operation of the filter driving mechanism 340. FIGS. 3A to 3C explain the operation of the filter driving mechanism 340, and illustrate states "a" to "c" of the filter driving mechanism 340, respectively.

The state "a" is a state (second state) corresponding to the second position at which the glass filter 330 is inserted into the imaging optical path, such as at night. A dotted line frame (imaging range 600a) indicates an actual imaging range. As illustrated in FIG. 3A, in the state "a," the filter holder 310 is moved to the left end by the filter driving mechanism 340. At this time, since nothing blocks the optical path within the imaging range 600a, a good image can be captured. The state "c" is a state (first state) corresponding to the first position at which the infrared cut filter 320 is inserted into the imaging optical path, such as in the daytime. As illustrated in FIG. 3C, in the state "c," the filter holder 310 has moved to the right end. In the state "c," similar to the state "a," nothing blocks the optical path in the imaging range 600c.

In a case where an in-vehicle application or strong shake is applied to the network camera 100, the infrared cut filter unit 300 may not normally operate. For example, as in the state "b" illustrated in FIG. 3B, the operation of the filter holder 310 may stop in the middle, or the position may gradually shift. In the state "b," the frame portion 312 of the filter holder 310 is within the imaging range 600b. At this time, the frame portion 312 is included in a captured image (the image data includes an area corresponding to the frame portion 312), and proper imaging may not be provided. Therefore, if the position of the filter holder 310 is incorrect, it is necessary to return the filter holder 310 to the normal position.

As described above, since the filter driving mechanism 340 calibrates the position of the filter holder 310 when the network camera 100 is powered on, the position of the filter holder 310 is not always grasped. Thus, the network camera 100 cannot detect an operation abnormality of the filter driving mechanism 340. In order to always detect the position of the filter holder 310, it is necessary to use another position detecting means such as a photo-interrupter or an encoder. However, such a dedicated position detecting means makes large the infrared cut filter unit 300 and increases the power consumption.

Accordingly, this embodiment performs the initialization operation of the filter driving mechanism 340 using the frame portion 312 that has been inserted into the imaging range 600 (600a to 600c). The initialization operation is an operation of disposing the infrared cut filter 320 in the optical path.

More specifically, the frame portion 312 is detected based on the image data acquired by the image sensor 240, and the initialization operation is performed based on some determination steps described below.

In order to improve the detection accuracy of the frame portion 312, the frame portion 312 has a plurality of shape portions, which include an approximately round detection shape 314, a detection shape 316 on the side of the infrared cut filter 320, and a detection shape 318 on the side of the glass filter 330. Each of the detection shapes 314, 416, and 318 has a penetrating shape to transmit light. The detection shape 316 transmits light that has passed through the infrared cut filter 320, and the detection shape 318 transmits light that has passed through the glass filter 330. This embodiment arranges the detection shapes 314, 316, and 318 asymmetrically in the longitudinal direction of the frame portion 312 with respect to the optical axis of the lens 210 as the center. Since the lens 210 is the single focus lens, a size of an optically recognizable shape can be calculated from the focal length. Each detection shape is larger than the optically recognizable size.

Figure 4:
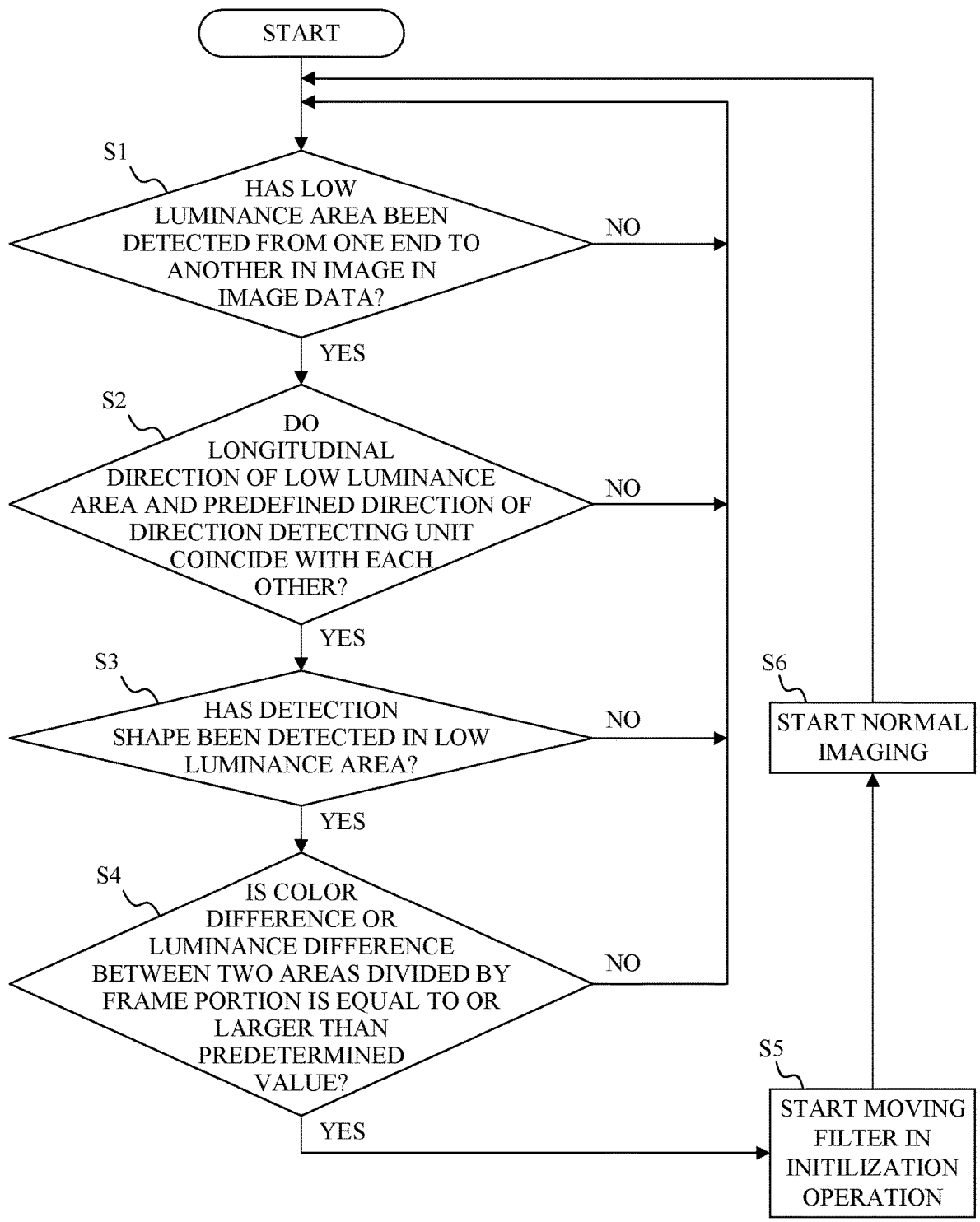
FIG. 4 is a flowchart of an initialization operation of the filter driving mechanism according to this embodiment.
Figure 5:
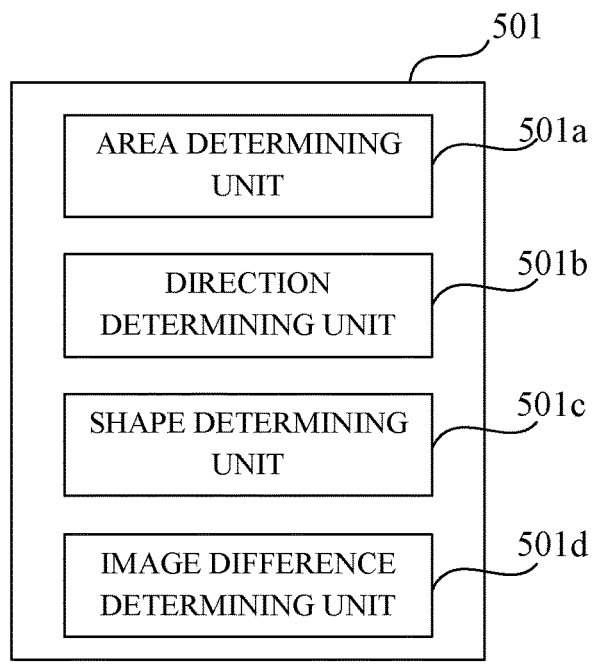
FIG. 5 is a block diagram of a control unit according to this embodiment.

Referring now to FIGS. 4 and 5, a description will be given of the initialization operation of the filter driving mechanism 340. FIG. 4 is a flowchart of the initialization operation of the filter driving mechanism 340. Each step in FIG. 4 is executed by the control unit 501 provided on the circuit board 500. FIG. 5 is a block diagram of the control unit 501.

First, in step S1, an area determining unit 501a determines whether or not a low luminance area existing from one end to the other of the image data is detected in the image (image data) obtained from the image sensor 240 (low luminance area detecting step). That is, the area determining unit 501a determines whether or not the low luminance area of the image data exists from a first end of the image data to a second end of the image data facing the first end (over both ends). The low luminance area is an area located on the side of the image sensor 240 of the frame portion 312, and having low luminance due to the effect of the low reflection unit 370. Since the frame portion 312 is approximately rectangular and disposed in a range larger than the imaging range of the image sensor 240, the low luminance area reaches the end of the image data. If the low luminance area is detected in step S1, the flow proceeds to step S2. On the other hand, if the low luminance area is not detected, the determination in step S1 is repeated.

In step S2, the direction determining unit 501b determines whether or not the longitudinal direction of the low luminance area and a predefined direction of the direction detecting unit 244 coincide with each other (direction determining step). Step S2 determines whether the low luminance area is the frame portion 312 or another object by determining whether or not one axis of the acceleration sensor as the direction detecting unit 244 and the longitudinal direction of the frame portion 312 coincide with each other. For example, in a case where an object such as a utility pole or a tree exists from one end to the other of the image and the direction of the object is different from the longitudinal direction of the frame portion 312, it is determined that the area is not the low luminance area. In a case where these directions coincide with each other in step S2, the flow proceeds to step S3. On the other hand, in a case where these directions do not coincide with each other, the flow returns to step S1.

In step S3, a shape determining unit 501c determines whether or not the detection shape 314 has been detected in the low luminance area (shape detecting step). Step S3 determines whether or not the low luminance area is the frame portion 312 by collating the shape pattern existing in the low luminance area with the pattern of the detection shape 314 previously stored in the network camera 100. In a case where the detection shape 314 is detected in the low luminance area in step S3, the flow proceeds to step S4. On the other hand, in a case where the detection shape 314 is not detected in the low luminance area, the flow returns to step S1.

In step S4, an image difference determining unit 501d determines whether or not a color difference or a luminance difference (image difference, that is, a difference in pixel value) between two areas divided by the frame portion 312 is equal to or larger than a predetermined value (image difference determination step). Since the infrared component is significantly different between the light that has passed through the infrared cut filter 320 and the light that has passed through the glass filter 330, a large color difference occurs. More specifically, since the light passing through the glass filter 330 contains a large amount of the infrared component, red is strongly emitted. Since the infrared LED 520 is turned on at night, the light passing through the infrared cut filter 320 is dark captured, and the light passing through the glass filter 330 is brightly captured, resulting in a large difference in luminance. It is determined based on this fact whether or not the low luminance area existing in the image data corresponds to the frame portion 312. In a case where the color difference or luminance difference between the two areas is equal to or larger than the predetermined value in step S4, the flow proceeds to step S5. On the other hand, in a case where the color difference or the luminance difference between the two areas is smaller than the predetermined value, the flow returns to step S1.

In a case where it is determined that the low luminance area corresponds to the frame portion 312 based on the results of steps S1 to S4, the control unit 501 performs the initialization operation of the filter driving mechanism 340 in step S5. The initialization operation may be performed in step S5 only in a case where a state in which the low luminance area is determined to correspond to the frame portion 312 continues for a predetermined period of time.

Next, in step S6, the control unit 501 starts normal imaging. That is, in a bright imaging environment, imaging is performed at the first position (first state) at which the infrared cut filter 320 is inserted into the imaging optical path. On the other hand, in a dark imaging environment, imaging is performed at the second position (second state) at which the glass filter 330 is inserted into the imaging optical path. Then, the control unit 501 continues to determine whether or not the filter driving mechanism 340 is normally operating, based on the image data. This embodiment does not always need all of the determinations in steps S1 to S4, and may determine whether or not to execute the initialization operation based on the determination result of at least one of steps S1 to S4.

According to this embodiment, the control unit 501 determines, based on the image data, whether or not the insertion/removal state of the infrared cut filter 320 is abnormal (such as a state in which the infrared cut filter 320 is stopped in the middle of the insertion/removal operation or a state in which the position of the infrared cut filter 320 is displaced). The control unit 501 may determine that the insertion/removal state is abnormal when detecting an area corresponding to the frame portion 312 in the image data. The control unit 501 may determine that the insertion/removal state is abnormal in a case where the color difference or the luminance difference between at least two areas in the image data is equal to or more than a predetermined value. In the case where the control unit 501 determines that the insertion/removal state is abnormal, the control unit 501 may perform the initialization operation of the filter driving mechanism 340. The control unit 501 may perform the initialization operation in a case where the abnormality in the insertion/removal state continues for a predetermined time.

As described above, even in a case where the abnormality occurs in the insertion/removal operation of the filter driving mechanism due to shake or impact in the vehicle, the initialization operation is performed without a dedicated position detecting component for the filter component, so that the user can acquire a stable image.

In this embodiment, the filter driving mechanism 340 includes a stepping motor and a gear, but another driving mechanism such as a galvano motor and a brushless motor may be used. This embodiment makes the detection shape 314 in the approximately round shape, but may make a different shape as long as it can transmit light and is optically recognizable. This embodiment may fix the infrared cut filter 320 and the glass filter 330 using screws or another component. In this embodiment, the direction detecting unit 244 may be another sensor such as a gyro sensor or an optical direction detecting sensor. In this embodiment, the low reflection unit 370 may be formed by a surface treatment method, for example, for embossing or painting the surface of the frame portion 312. In this embodiment, the infrared cut filter 320 filters infrared light at a boundary of approximately 700 nm, but may filter a different wavelength depending on applications.

Figure 6:
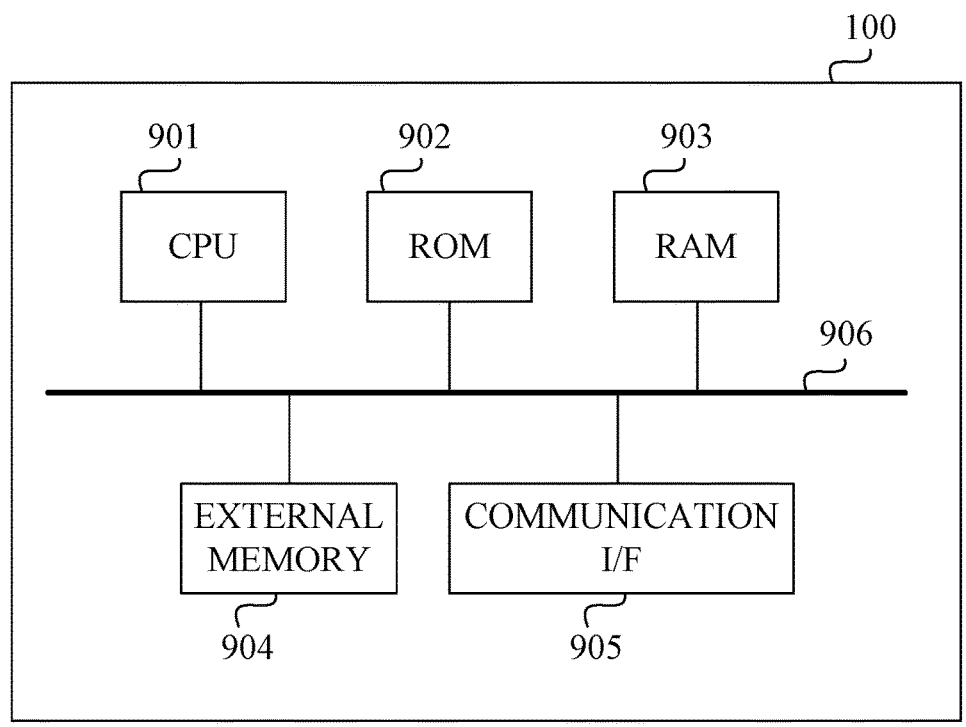
FIG. 6 is a block diagram illustrating a hardware configuration of image pickup apparatus (network camera) according to this embodiment.

FIG. 6 illustrates an example of a hardware configuration of the network camera 100. The network camera 100 includes a central processing unit (CPU) 901, a read only memory (ROM) 902, a random access memory (RAM) 903, an external memory 904, a communication interface (I/F) 905, and a system bus 906.

The CPU 901 totally controls operations of the network camera 100, i.e., controls each of construction units 902 to 905 via the system bus 906.

The ROM 902, a nonvolatile memory, stores a control program required for the CPU 901 to perform processing. The relevant program may be stored in the external memory 904 or a detachably attached storage medium.

The RAM 903 functions as a main memory for the CPU 901 and a work area. More specifically, when performing processing, the CPU 901 loads a required program from the ROM 902 into the RAM 903 and then executes the relevant program, thus implementing various functions and operations.

The external memory 904 stores, for example, various data and various information required for the CPU 901 to perform processing by using a program. The external memory 904 also stores, for example, various data and various information acquired when the CPU 901 performs processing based on a program.

The communication I/F 905 is an interface for communicating with an external apparatus. The communication I/F 905 is, for example, a local area network (LAN) interface. The external apparatus is assumed to be a monitoring apparatus or recording apparatus connected to the network camera via a network. The system bus 906 connects the CPU 901, the ROM 902, the RAM 903, the external memory 904, and the communication I/F 905 so that they are able to communicate with each other.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

This embodiment performs the initialization operation without a position detecting unit of the infrared cut filter, and can provide a user with a stable image, even if an abnormality occurs during the insertion/removal operation of the infrared cut filter due to shake or impact. Therefore, this embodiment can provide an image pickup apparatus, a control method of the same, and a storage medium, each of which can detect an abnormality in an insertion or removal state of an infrared cut filter with low power consumption and a small configuration.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-183581, filed on Nov. 10, 2021, which is hereby incorporated by reference herein in its entirety.

What is claimed is:

1. An image pickup apparatus comprising:
an optical system;
an image sensor configured to photoelectrically convert an optical image formed by the optical system and to output image data;
an infrared cut filter movable between a first position at which the infrared cut filter is inserted into an optical path of the optical system and a second position at which the infrared cut filter is removed from the optical path of the optical system;
a hardware processor; and
a memory for storing instructions to be executed by the hardware processor, wherein, when the instructions stored in the memory are executed by the hardware processor, the image pickup apparatus functions as:
a control unit configured to determine, based on the image data, whether or not the infrared cut filter is located at a position different from each of the first position and the second position.

2. The image pickup apparatus according to claim 1, further comprising a filter holder configured to hold the infrared cut filter,
wherein in a case where the control unit detects the filter holder in the image data, the control unit determines that the infrared cut filter is located at the position different from each of the first position and the second position.

3. The image pickup apparatus according to claim 1, wherein the control unit determines that the infrared cut filter is located at the position different from each of the first position and the second position in a case where a color difference or a luminance difference between at least two areas in the image data is equal to or larger than a predetermined value.

4. The image pickup apparatus according to claim 2, wherein the control unit moves the filter holder in a case where the control unit determines that the infrared cut filter is located at the position different from each of the first position and the second position.

5. The image pickup apparatus according to claim 1, wherein the control unit performs an initialization operation of the infrared cut filter in a case where the control unit determines that the infrared cut filter is located at the position different from each of the first position and the second position.

6. The image pickup apparatus according to claim 5, wherein the initialization operation is an operation of disposing the infrared cut filter in the optical path.

7. The image pickup apparatus according to claim 5, wherein the control unit performs the initialization operation in a case where a state in which the infrared cut filter is located at the position different from each of the first position and the second position continues for a predetermined time.

8. The image pickup apparatus according to claim 2, wherein the filter holder includes a detection portion that is used to detect an abnormality in insertion and removal states of the infrared cut filter into and from the optical path.

9. The image pickup apparatus according to claim 8, wherein the detection portion is formed in the filter holder so as to penetrate the filter holder, and
wherein light from the optical system passes through the detection portion and is received by the image sensor.

10. The image pickup apparatus according to claim 8, comprising a plurality of detection portions,
wherein the plurality of detection portions are asymmetrically arranged in a longitudinal direction of a frame portion of the filter holder with respect to an optical axis of the optical system as a center, wherein the frame portion of the filter holder is disposed between the infrared cut filter and a glass filter held by the filter holder.

11. The image pickup apparatus according to claim 10, wherein one of the plurality of detection portions transmits light that has passed through the infrared cut filter, and
wherein another of the plurality of detection portions transmits light that has passed through a glass filter held by the filter holder.

12. The image pickup apparatus according to claim 8, wherein the filter holder includes a low reflection unit having a reflectance of 5% or less.

13. The image pickup apparatus according to claim 12, wherein the low reflection unit includes a penetration portion at a position corresponding to the detection portion.

14. The image pickup apparatus according to claim 8, wherein the optical system includes a single focus lens, and
wherein the detection portion is as large as or larger than an optically recognizable size.

15. The image pickup apparatus according to claim 2, further comprising a direction detecting unit configured to detect a predetermined direction,
wherein one axis of the direction detecting unit coincides with a longitudinal direction of a frame portion of the filter holder wherein the frame portion of the filter holder is disposed between the infrared cut filter and a glass filter held by the filter holder.

16. The image pickup apparatus according to claim 1, wherein the control unit determines whether or not a low luminance area of the image data exists from a first end to a second end in the image data.

17. The image pickup apparatus according to claim 2, wherein the control unit determines whether or not a longitudinal direction of a low luminance area of the image data coincides with a longitudinal direction of a frame portion of the filter holder wherein the frame portion of the filter holder is disposed between the infrared cut filter and a glass filter held by the filter holder.

18. The image pickup apparatus according to claim 8, wherein the control unit determines whether or not to detect the detection portion in a low luminance area of the image data.

19. A control method of an image pickup apparatus including an infrared cut filter movable between a first position at which the infrared cut filter is inserted into an optical path of an optical system and a second position at which the infrared cut filter is removed from the optical path of the optical system, the control method comprising the steps of:

acquiring image data by photoelectrically converting an optical image formed by the optical system; and determining, based on the image data, whether or not the infrared cut filter is located at a position different from each of the first position and the second position.

20. A non-transitory computer-readable storage medium storing a program that causes a computer to execute a control method of an image pickup apparatus including an infrared cut filter movable between a first position at which the infrared cut filter is inserted into an optical path of an optical system and a second position at which the infrared cut filter is removed from the optical path of the optical system, the control method comprising the steps of:

acquiring image data by photoelectrically converting an optical image formed by the optical system; and determining, based on the image data, whether or not the infrared cut filter is located at a position different from each of the first position and the second position.

* * * * *